United States Patent
Kruse et al.

(10) Patent No.: US 8,376,113 B2
(45) Date of Patent: Feb. 19, 2013

(54) ACTUATION DEVICE FOR A CLUTCH

(75) Inventors: Georg Kruse, Gifhorn (DE); Roland Meyer, Nürtingen (DE); Markus Novotny, Zierenberg (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 466 days.

(21) Appl. No.: 12/679,340

(22) PCT Filed: Aug. 14, 2008

(86) PCT No.: PCT/EP2008/006675
§ 371 (c)(1),
(2), (4) Date: Mar. 22, 2010

(87) PCT Pub. No.: WO2009/039918
PCT Pub. Date: Apr. 2, 2009

(65) Prior Publication Data
US 2010/0193316 A1 Aug. 5, 2010

(30) Foreign Application Priority Data
Sep. 20, 2007 (DE) .......................... 10 2007 045 056

(51) Int. Cl.
*F16D 48/02* (2006.01)

(52) U.S. Cl. ..................... 192/85.63; 60/588; 192/85.01

(58) Field of Classification Search ............... 192/85.55, 192/85.6, 85.62
See application file for complete search history.

(56) References Cited

U.S. PATENT DOCUMENTS

| 2,158,440 | A | 5/1939 | Spase |
| 5,036,965 | A | 8/1991 | Cortesi et al. |
| 5,060,776 | A | 10/1991 | Skog et al. |
| 5,795,263 | A | 8/1998 | Harries |
| 5,850,898 | A | 12/1998 | Böhme et al. |
| 6,607,060 | B2 | 8/2003 | Inoue |

FOREIGN PATENT DOCUMENTS

| DE | 3732427 A1 | 4/1989 |
| DE | 4309901 A1 | 9/1994 |
| DE | 19633420 A1 | 3/1997 |
| DE | 69512735 T2 | 8/2001 |
| EP | 0399399 A1 | 11/1990 |
| GB | 2249815 A | 5/1992 |
| GB | 2 295 435 A * | 5/1996 |

OTHER PUBLICATIONS

German Search Report dated Jul. 4, 2008.

* cited by examiner

*Primary Examiner* — Rodney Bonck
(74) *Attorney, Agent, or Firm* — Laurence A. Greenberg; Werner H. Stemer; Ralph E. Locher

(57) ABSTRACT

An actuation device and a method for actuating a clutch, in particular for a hybrid drive, include a master cylinder having an interior separated by a master piston into master and slave oil chambers. The slave oil chamber is connected, via a valve in a first valve position, to a tank line leading to an oil reservoir and in a second valve position, to a pressure line of the oil reservoir. The master oil chamber is connected via a working line to an oil chamber of a slave cylinder and to a compensating tank via a compensating line as a function of the position of the master piston. The compensating tank has a compensating volume which has, at its highest point, an overflow which is connected to the tank line and in its first position the valve connects the slave oil chamber to the compensating tank via a return line.

12 Claims, 3 Drawing Sheets

ACTUATION DEVICE FOR A CLUTCH

BACKGROUND OF THE INVENTION

Field of the Invention

The invention relates to an actuation device for a clutch, in particular for a hybrid drive, having a master cylinder whose interior space is divided by a master piston into a slave oil chamber and a master oil chamber, with the slave oil chamber being connected by means of a valve to a tank line to an oil reservoir in a first valve position and to a pressure line from the oil reservoir in a second valve position, and with the master oil chamber being connected via a working line to the oil chamber of a slave cylinder and via a compensating line, as a function of the position of the master piston, to a compensating tank.

The invention also relates to a method for actuating a clutch, in particular for a hybrid drive, in which method, to activate a working piston in a slave cylinder which is assigned to a clutch, a slave oil chamber of a master cylinder is filled with oil via a valve which connects the slave oil chamber to a pressure line of an oil reservoir, with the oil being pressed from a master oil chamber of the master cylinder via a working line into an oil chamber of the slave cylinder, and moving the working piston into its activating position, as a result of a movement of a master piston, wherein in order to restore the working piston, the slave oil chamber of the master cylinder is separated from the pressure line and connected to a tank line by means of the valve and is emptied, wherein in the initial position of the master piston, the master oil chamber is ventilated via a compensating tank and a lack of oil volume is compensated.

Hybrid drives have the aims not only of providing a reduction in fuel consumption and pollutant emissions but also of providing an increase in comfort, an increase in performance and zero-emissions driving. To achieve some of these aims, it is necessary to shut down the internal combustion engine and drive under purely electric power (for example: zero-emissions driving). In the parallel architecture of a hybrid drivetrain, it is necessary for this purpose to arrange an additional clutch between the internal combustion engine and the electric machine in order to separate the internal combustion engine from the drivetrain. Said clutch must be activated, corresponding to a driving strategy, as a function of the operating state.

In the case of a hydraulic actuation device of a clutch, such as is known for example from DE 43 09 901A1, use is made of a master cylinder which displaces a defined oil quantity into a slave cylinder. Said slave cylinder finally activates, for example as a central release unit, a clutch. In the master cylinder, in the rear end position, that is to say without activation, a hydraulic connection to a compensating tank is opened up. The system is firstly ventilated via said connection during regular operation, and secondly, an automatic adjustment of the clutch takes place by means of said connection with progressive wear of said clutch. For an automatic actuation of the clutch, a hydraulic controller is required. As a result, two hydraulic circuits are formed: the hydraulic actuation device and the hydraulic clutch activation path with associated compensating tank.

A disadvantage of the known actuation device is that, in the case of an additional clutch, a corresponding amount of additional installation space must be reserved for the entire hydraulic activation means. The additional compensating tank entails a certain amount of additional expenditure, for example regular monitoring of the filling level in the compensating tank. Furthermore, DE 196 33 420 A1 discloses a method and a device for the hydraulic activation of a clutch. Here, the slave oil chamber and the master oil chamber are connected by means of a common proportional valve to an oil reservoir. It is a disadvantage here that, although compensation of the clutch wear is possible as a result of a connection of the master oil chamber via the proportional valve to the tank line of the oil reservoir, operational ventilation is possible at best to a limited extent as a result of the lack of a separate compensating tank.

BRIEF SUMMARY OF THE INVENTION

It is therefore an object of the present invention to propose an actuation device and a method for actuating a clutch which enables as compact and low-maintenance a system as possible. Here, both the functionality of the operational ventilation and also the compensation of the clutch wear should be maintained.

The object with regard to the actuation device of a clutch is achieved in that the valve, in its first position, connects the slave oil chamber via a return line to the compensating tank and in that the compensating tank has a compensating volume which, at its highest point, has an overflow which is connected to the tank line.

Since the compensating tank has an overflow which is connected to the tank line and the slave oil chamber is connected not directly to the tank line but rather via the compensating volume or the compensating tank to the oil reservoir, it is possible for the compensating tank or its compensating volume to be designed to be considerably smaller than in the prior art. As a result of the integration of the compensating tank or compensating volume into a hydraulic circuit, the compensating volume is re-filled with every activation of the master cylinder. At the same time, the functionality of the operational ventilation and also the compensation of the clutch wear are maintained. Furthermore, it is advantageous that the system, upon initial operation or after maintenance work on the hydraulic clutch activation path, can be filled automatically with hydraulic oil by means of repeated activation.

According to a second preferred embodiment of the invention, the master cylinder, the compensating tank and the valve are arranged in a housing and form an actuation unit. In this way, a compact and low-maintenance activation unit is obtained which may be of identical design for both clutches of a hybrid drive.

According to a further preferred embodiment of the invention, the activation unit has an external working connection for connecting to the slave cylinder, an external tank connection and an external pressure connection for connecting to the oil reservoir, and a valve control connection for connecting a control unit to a valve actuation device of the valve. This permits simple assembly or simple exchange of the actuation unit.

According to a further preferred embodiment of the invention, when an equal pressure level prevails on both sides of the master cylinder, the master piston has equal-sized hydraulically acting piston surfaces pointing toward the slave oil chamber and toward the master oil chamber. When different pressure levels prevail on the two sides of the master cylinder, the master piston may have different-sized hydraulically acting piston surfaces pointing toward the slave oil chamber and toward the master oil chamber. Here, the ratio of piston areas on the master and slave sides produces a pressure boost or pressure reduction.

According to a further preferred embodiment of the invention, between the master piston and master cylinder, a seal is arranged in an annular groove in such a way that, in an end position of the master piston when the slave oil chamber is empty, the opening of the compensating line to the master oil chamber is exposed, with a passage which connects the master oil chamber to the opening of the compensating line being formed in a region, which is situated upstream of the seal in the direction of the master oil chamber, between the piston circumference and the adjacent cylinder inner wall. In said position, the master oil chamber is ventilated to the compensating volume, or a differential volume in the master oil chamber resulting from wear of the clutch can be filled with oil from the compensating tank, or compensated.

The seal which seals off the piston with respect to the master oil chamber during a movement may be arranged both in an encircling groove of the master piston and also in an encircling groove of the master cylinder wall.

With regard to the method for actuating a clutch, the object is achieved in that the slave oil chamber, in order to be emptied, is connected by means of the valve to the compensating tank and the latter is filled, with excess oil being supplied back to the oil reservoir via an overflow of the compensating tank via the tank line which is connected to the overflow.

In this way, during the return stroke of the master piston, the actuation oil volume is conducted from the slave oil chamber into the compensating tank and excess oil flows back into the oil reservoir of the hydraulic controller via the overflow. The compensating volume is thus re-filled with every activation of the master piston. At the same time, the compensating tank ensures operational ventilation of the clutch activation path. As a result of the overflow and the connection to the oil reservoir, it is possible for the compensating tank to be designed to be relatively small, that is to say with a smaller compensating volume, while maintaining the same function as the known compensating tanks. The method according to the invention eliminates the need for monitoring the filling level of the compensating tank.

According to a further embodiment of the invention, in the event of the clutch activation path being completely empty, the master cylinder is actuated repeatedly in order to completely fill the master oil chamber and compensating tank. In this way, the system can be filled automatically with hydraulic oil upon initial operation or after maintenance work on the hydraulic clutch activation path.

BRIEF DESCRIPTION OF THE SEVERAL VIEWS OF THE DRAWING

Further details of the invention will emerge from the following detailed description and from the appended drawings which show preferred embodiments of the invention by way of example. In the drawings.

DESCRIPTION OF THE INVENTION

Figure 1:
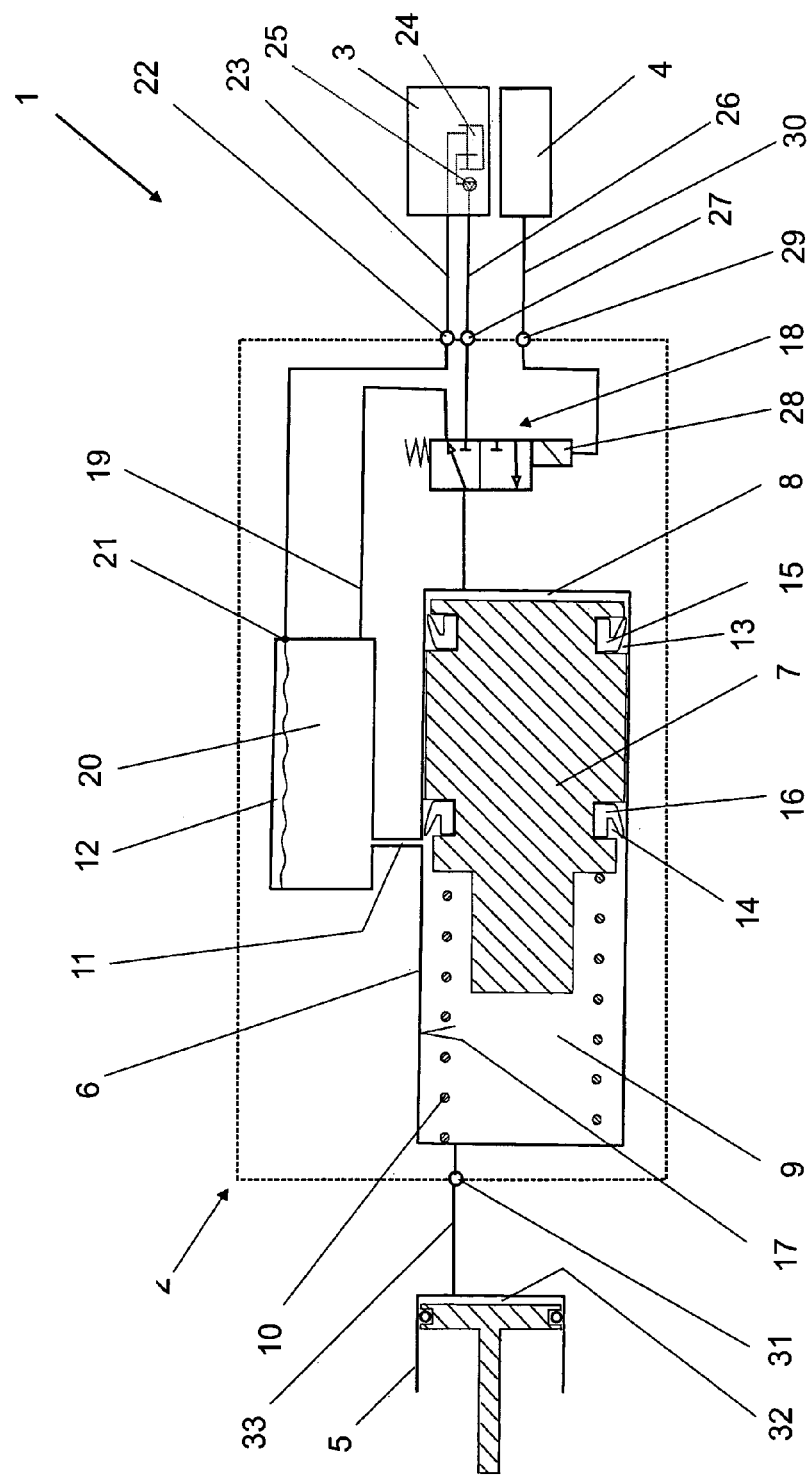
FIG. 1 is a schematic illustration of an actuation device for a clutch with integrated compensating tank and common oil circuit.

The actuation device 1 of a clutch is composed substantially of an actuation unit 2, a hydraulic controller 3, a control unit 4 and a slave cylinder 5 for actuating a clutch.

The actuation unit 2 is composed of a master cylinder 6 whose interior space is divided by a longitudinally movable master piston into a slave oil chamber 8 and a master oil chamber 9. Arranged in the master oil chamber 9 is a pressure spring 10 which presses the master piston 7 into its initial position in the slave oil chamber 8 in the unpressurized state. In the initial position of the master piston 7, the master oil chamber is connected via a compensating line 11 to a compensating tank 12. The master piston 7 has in each case one annular groove 13, 14 pointing in the direction of the slave oil chamber 8 and in the direction of the master oil chamber 9 respectively, in each of which annular grooves is held a seal 15, 16 for sealing off with respect to the cylinder inner wall 17 adjacent to the piston. In addition to the master cylinder 6 and the compensating tank 12, a valve 18 is also arranged in the actuation unit 2. The valve 18, when in a first position, connects the slave oil chamber 8 via a return line 19 to the compensating tank 12.

The compensating tank 12 has a compensating volume 20 which, at its highest point, has an overflow 21 which is connected via a tank connection 22 to the tank line 23 to an oil reservoir 24 of the hydraulic controller 3. In a second position, the valve 18 connects a pressure line 26, which is fed from the oil reservoir 24 or the hydraulic controller 3, to the slave oil chamber 8 via an external pressure connection 27 of the actuation unit 2. The valve 18 is controlled by a valve actuation device 28 which is connected via a control line 30 to the control unit 4 via an external valve control connection 29 of the actuation unit 2.

The master oil chamber 9 is connected via an external working connection 31 of the actuation unit 2 to a working line 33 which leads to an oil chamber 32 of the slave cylinder 5.

During a return stroke of the master piston 7, the actuation volume is conducted, when the valve 18 is in the first valve position, from the slave oil chamber 8 into the compensating tank 12 via the return line 19. Here, the compensating volume 20 is filled and excess oil is conducted via the overflow 21 and the tank line 23 into the oil reservoir 24 of the hydraulic controller 3. The compensating volume 20 or the compensating tank 12 is thus refilled with every activation of the master piston 7. Here, operational ventilation of the clutch activation path is ensured via the compensating line 11. A sufficiently large cross section of the compensating line 11 as a connection between the compensating volume 20 and master oil chamber 9 ensures the function of the automatic initial filling and refilling by means of repeated activation. The size of the cross section of the hydraulic connection or of the compensating line 11 is selected here such that the oil can flow unforced from the compensating volume 20 of the compensating tank 12 into the master oil chamber 9.

The filling process begins, when the clutch activation path is completely empty, with the actuation of the master piston 7 by means of the hydraulic controller 3. During the return stroke of the master piston 7, the actuation oil volume is displaced from the slave oil chamber 8 into the compensating volume 20 and, in the end position of the master piston 7, flows through the compensating line 11 into the master oil chamber 9. The next actuation causes the oil which has passed into the master oil chamber 9 to be displaced into the slave cylinder 5. The slave cylinder 5 is hereby partially filled with oil. Since the actuation unit 2 is situated at the highest point of the hydraulic system, air from the slave cylinder 5 is displaced into the master oil chamber 9 of the master cylinder 6 during the return stroke. At the same time, the actuation oil is in turn displaced from the slave oil chamber 8 of the master cylinder 6 into the compensating volume 20 or the compensating tank 12 and flows from here into the master oil chamber 9. This is followed by a suitable number of further activations until the slave cylinder 5 is completely filled in the above-described way, and the master oil chamber 9 is ventilated and the compensating tank 12 is completely filled. The adjustment of the clutch (not illustrated) with progressive wear is likewise realized as a result of the connection of the compensating volume 20 to the external tank connection 22. As the clutch lining wears, the clutch can engage progressively further than it can in the new state. This results in a differential oil volume which must be conveyed out of the slave cylinder 5 in order to fully close the clutch. During the return stroke, the master piston 7 accommodates the actuating volume defined by the piston diameter and stroke, and when the hydraulic connection is opened up, the differential oil volume escapes into the compensating volume 20 and from there via the overflow 21 into the oil reservoir 24 of the hydraulic controller 3.

Figure 2:
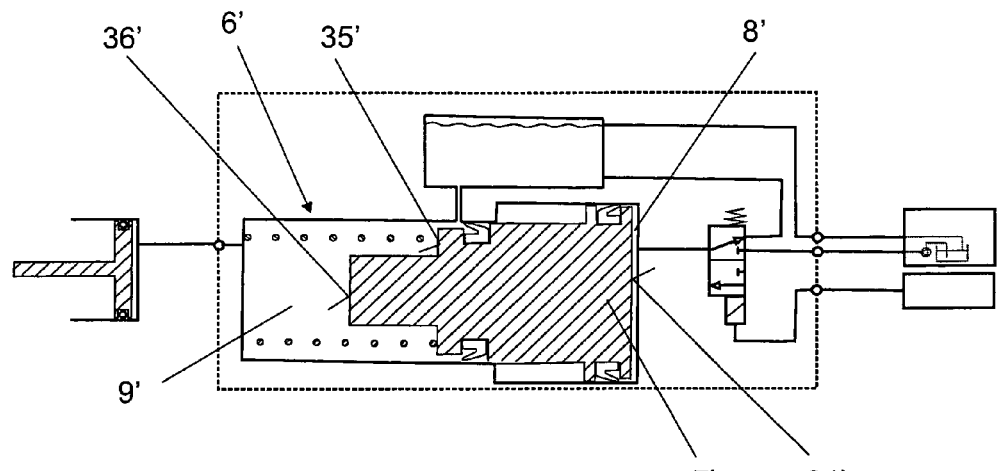
FIG. 2 is a schematic illustration of an actuation device having a master cylinder with a stepped master piston.

In the exemplary embodiment of FIG. 2, the master cylinder 6' has a stepped master piston 7'. Here, the ratio of the slave-side piston surface area 34' to the hydraulically acting master-side piston surface areas 35', 36' yields a pressure boost.

Figure 3:
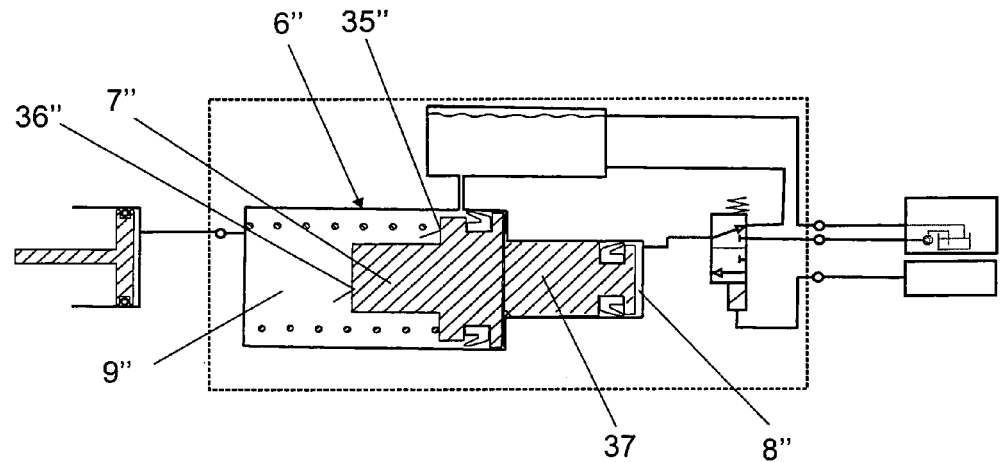
FIG. 3 is a schematic illustration of an actuation device for a clutch having a master cylinder with a master piston and upstream pilot piston.

In the exemplary embodiment of FIG. 3, a pilot piston 37 is positioned upstream of the master piston 7" of the master cylinder 6" in the direction of the slave oil chamber 8". This yields a pressure reduction.

Figure 4:
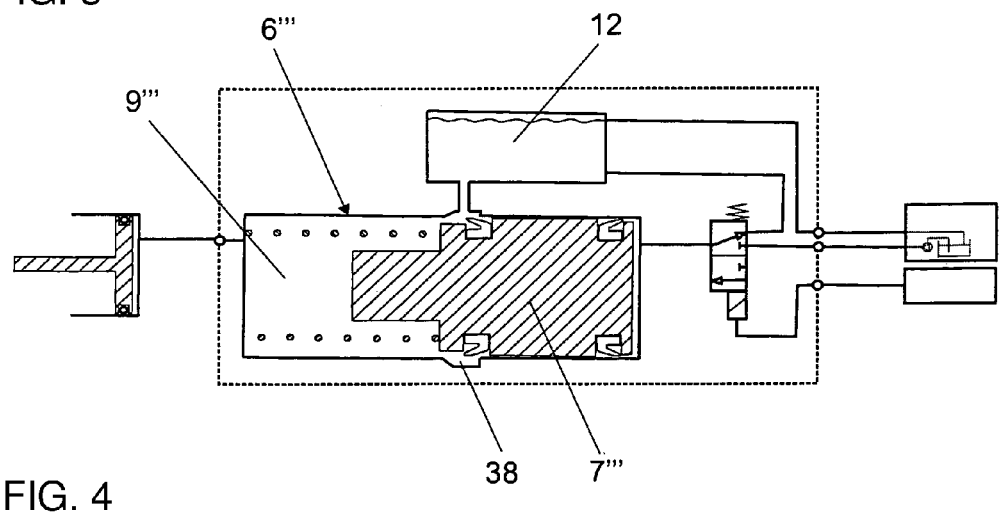
FIG. 4 is a schematic illustration of an actuation device for a clutch having an annular duct in the master cylinder and FIG. 5 is a schematic illustration of an actuation device for a clutch having a master cylinder and having a seal arranged in an encircling groove of the master cylinder wall.

In the exemplary embodiment of FIG. 4, the master cylinder 6''' has an annular duct 38 which ensures a sufficient cross section of the hydraulic connection between the compensating tank 12 and the master oil chamber 9'''.

Figure 5:
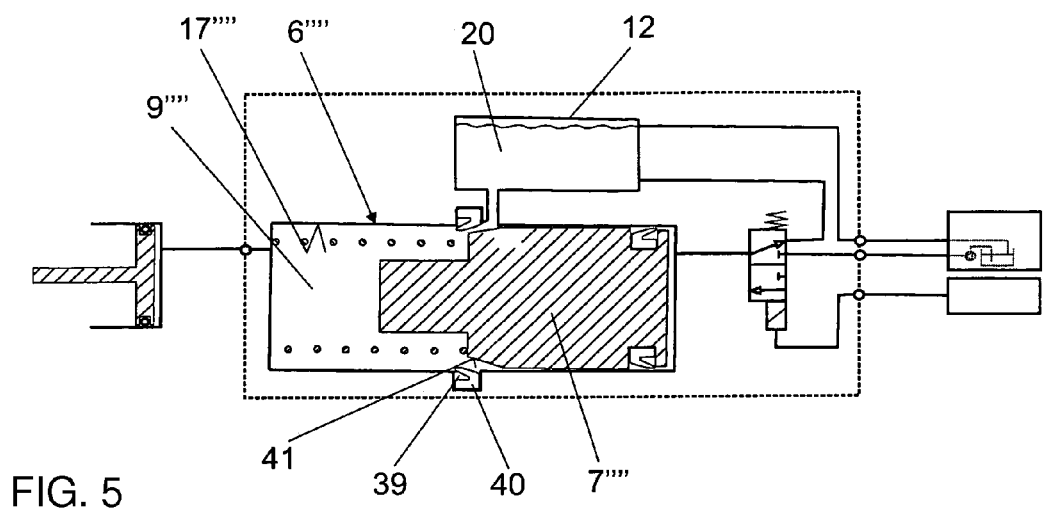

In the exemplary embodiment of FIG. 5, the master cylinder 6'''' has an annular groove 39 with a seal 40 for sealing off the master oil chamber 9'''' with respect to the master piston 7''''. In its unpressurized initial position, the master piston 7'''' has a flattened portion 41 adjacent to the seal 40. The flattened portion 41 is likewise intended to ensure a sufficient cross section of the hydraulic connection between the compensating volume 20 and master oil chamber 9''''.

List of Reference Symbols

1 Actuation device
2 Actuation unit
3 Hydraulic controller
4 Control unit
5 Slave cylinder
6, 6', 6", 6''', 6'''' Master cylinder
7, 7', 7", 7'''' Master piston of 6
8, 8', 8" Slave oil chamber of 6
9, 9', 9", 9'''' Master oil chamber of 6
10 Pressure spring
11 Compensating line
12 Compensating tank
13 Annular groove
14 Annular groove
15 Seal
16 Seal
17, 17'''' Cylinder inner wall
18 Valve
19 Return line
20 Compensating volume
21 Overflow from 20/12
22 Tank connection of 2
23 Tank line
24 Oil reservoir
25 Pump
26 Pressure line
27 External pressure connection of 2
28 Valve actuation device
29 Valve control connection of 2
30 Control line
31 Working connection of 2
32 Oil chamber of 5
33 Working line
34, 34', 34" Slave-side piston surface
35, 35', 35" Master-side piston surface
36, 36', 36" Master-side piston surface
37 Pilot piston
38 Annular duct
39 Annular groove of 6''''
40 Seal
41 Flattened portion

The invention claimed is:

1. An actuation device for a clutch, the actuation device comprising:
   a master cylinder having an interior space;
   a master piston dividing said interior space of said master cylinder into a slave oil chamber and a master oil chamber;
   an oil reservoir;
   a tank line leading to said oil reservoir;
   a pressure line leading from said oil reservoir;
   a valve connected to said slave oil chamber, said valve having a first valve position and a second valve position, said valve connecting said slave oil chamber to said pressure line in said second valve position;
   a slave cylinder having an oil chamber;
   a working line connected to said oil chamber of said slave cylinder;
   a compensating tank including a compensating volume having a highest point with an overflow connected to said tank line;
   a compensating line connected to said compensating tank;
   said master oil chamber being connected to said working line and, depending on a position of said master piston, to said compensating line;
   a return line connected to said compensating tank; and
   said valve connecting said slave oil chamber to said return line in said first valve position.

2. The actuation device according to claim 1, wherein said master cylinder, said compensating tank and said valve are disposed in a housing and form an actuation unit.

3. The actuation device according to claim 2, which further comprises:
   a control unit;
   said valve having a valve actuation device; and
   said actuation unit having an external working connection for connection to said slave cylinder, an external tank connection and an external pressure connection for connection to said oil reservoir, and a valve control connection for connecting said control unit to a valve actuation device of said valve.

4. The actuation device according to claim 1, wherein said master piston has equal-sized hydraulically acting piston surfaces pointing toward said slave oil chamber and toward said master oil chamber, when an equal pressure level prevails on both sides of said master cylinder.

5. The actuation device according to claim 1, wherein said master piston has different-sized hydraulically acting piston surfaces pointing toward said slave oil chamber and toward said master oil chamber.

6. The actuation device according to claim 1, which further comprises:
   a seal disposed in an annular groove between said master piston and said master cylinder;
   said compensating line having an opening leading into said master oil chamber;
   said master piston having a piston periphery;
   said master oil chamber having a cylindrical inner wall adjacent said piston periphery; and
   in an end position of said master piston with said slave oil chamber empty, said opening of said compensating line to said master oil chamber being exposed and a passage connecting said master oil chamber to said opening of said compensating line being formed in a region upstream of said seal in direction of said master oil chamber, between said piston periphery and said adjacent cylindrical inner wall.

7. The actuation device according to claim 6, wherein said seal is disposed in an encircling groove of said master piston.

8. The actuation device according to claim 6, wherein said seal is disposed in an encircling groove of said cylindrical inner wall.

9. The actuation device according to claim 1, wherein the clutch is for a hybrid drive and the actuation device is configured to actuate the hybrid drive clutch.

10. A method for actuating a clutch, the method comprising the following steps:
    providing a master cylinder having a master oil chamber, a slave oil chamber and a master piston;
    activating a working piston in a slave cylinder associated with a clutch by filling the slave oil chamber with oil through a valve connecting the slave oil chamber to a pressure line of an oil reservoir;
    forcing the oil from the master oil chamber through a working line into an oil chamber of the slave cylinder;
    moving the working piston into an activating position as a result of a movement of the master piston;
    restoring the working piston by separating the slave oil chamber from the pressure line and connecting the slave oil chamber to a tank line with the valve and emptying the slave oil chamber;
    venting the master oil chamber through a compensating tank and compensating for a lack of oil volume, in an initial position of the master piston; and
    emptying the slave oil chamber by connecting the slave oil chamber with the valve to the compensating tank and filling the compensating tank, with excess oil being supplied back to the oil reservoir through an overflow of the compensating tank and through the tank line connected to the overflow.

11. The method according to claim 10, which further comprises, in the event of a clutch activation path being completely empty, repeatedly actuating the master cylinder to completely fill the master oil chamber and the compensating tank.

12. The method according to claim 11, wherein the clutch is for a hybrid drive and the actuation device is configured to actuate the hybrid drive clutch.

* * * * *